US012625075B2

(12) United States Patent
Vespone et al.

(10) Patent No.: US 12,625,075 B2
(45) Date of Patent: May 12, 2026

(54) LIGHT DETECTION MODULE AND APPARATUS FOR DETECTING TARGET ANALYTE COMPRISING THE SAME

(71) Applicant: SEEGENE, INC., Seoul (KR)

(72) Inventors: Benjamin Vespone, Rochester, NY (US); Alexander Bandazian, Providence, RI (US); Haskell Kent, Medford, MA (US); Kevin Sweeney, Boston, MA (US)

(73) Assignee: SEEGENE, INC., Seoul (KR)

( * ) Notice: Subject to any disclaimer, the term of this patent is extended or adjusted under 35 U.S.C. 154(b) by 823 days.

(21) Appl. No.: 17/976,161

(22) Filed: Oct. 28, 2022

(65) Prior Publication Data

US 2024/0142376 A1 May 2, 2024

(51) Int. Cl.
*G01N 21/64* (2006.01)
*B01L 3/00* (2006.01)

(52) U.S. Cl.
CPC ........ *G01N 21/6428* (2013.01); *B01L 3/5085* (2013.01); *B01L 2300/0654* (2013.01); *G01N 2201/062* (2013.01); *G01N 2201/08* (2013.01)

(58) Field of Classification Search
None
See application file for complete search history.

(56) References Cited

U.S. PATENT DOCUMENTS 8,236,504 B2 8/2012 Kordunsky et al.
2003/0156290 A1* 8/2003 Colvin, Jr. ......... G01N 21/7703
356/417

2007/0030583 A1* 2/2007 Lin ...................... G02B 26/008
359/892
2011/0128545 A1* 6/2011 Cox ....................... G01N 21/11
356/417
2012/0243079 A1* 9/2012 Bohm ................... G02B 21/24
359/368
2012/0295268 A1* 11/2012 Furlan ................... G02B 7/006
435/6.12
2018/0223335 A1* 8/2018 Kreifels ................. C12Q 1/686

FOREIGN PATENT DOCUMENTS

CN          102106723 A    6/2011
JP          2000-307827 A  11/2000
JP          2017-503639 A   2/2017
KR   10-2006-0022413 A     3/2006
KR   10-2021-0061815 A     5/2021

OTHER PUBLICATIONS

Office Action ("Notice of Submission of Opinion") dated Sep. 22, 2025 for related Korean Patent Application No. 10-2023-0143789.

* cited by examiner

*Primary Examiner* — Neil N Turk
(74) *Attorney, Agent, or Firm* — Sughrue Mion, PLLC

(57) ABSTRACT

A light detection module according to the present disclosure includes an optical fiber mounting unit having a plurality of optical fibers disposed on one side thereof; a filter wheel spaced apart from the other side of the optical fiber mounting unit, the filter wheel having a plurality of filters; a drive unit for rotating the filter wheel; a light source unit for generating excitation light passing through the filter wheel; and a detection unit for detecting emission light passing through the filter wheel, wherein the plurality of filters includes a plurality of excitation light filters for filtering the excitation light and a plurality of emission light filters for filtering the emission light.

15 Claims, 10 Drawing Sheets

[Fig. 1]
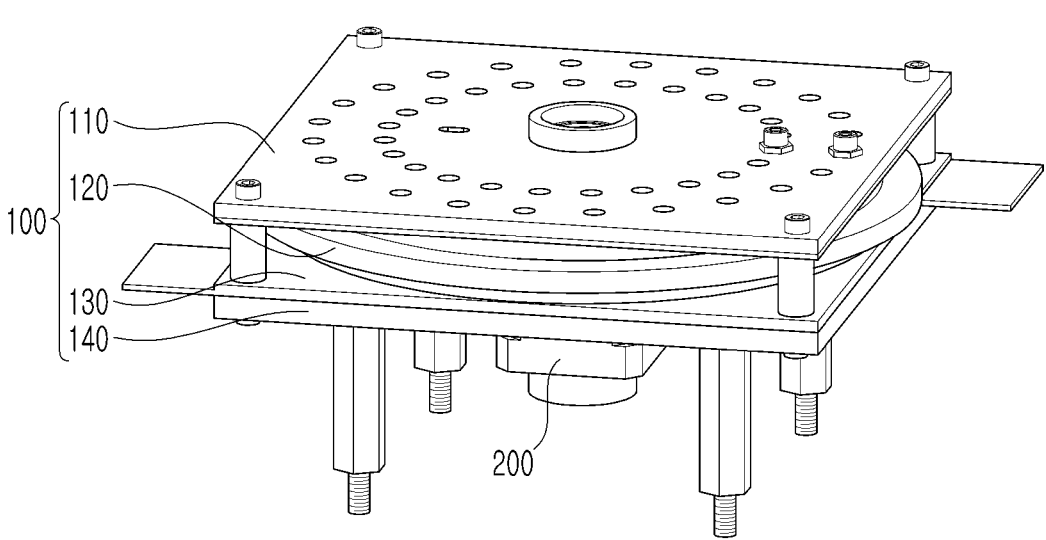

[Fig. 2]
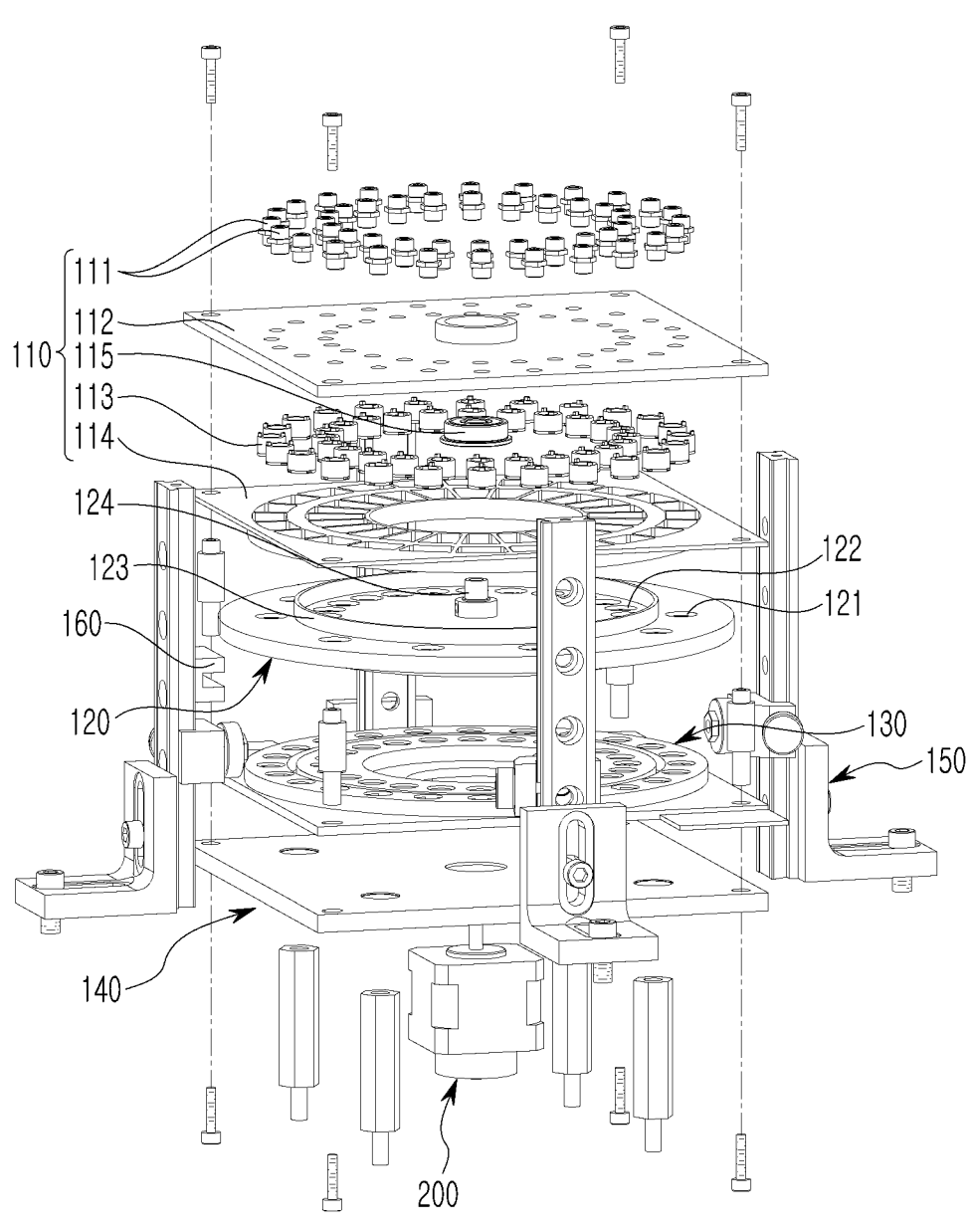

[Fig. 3]
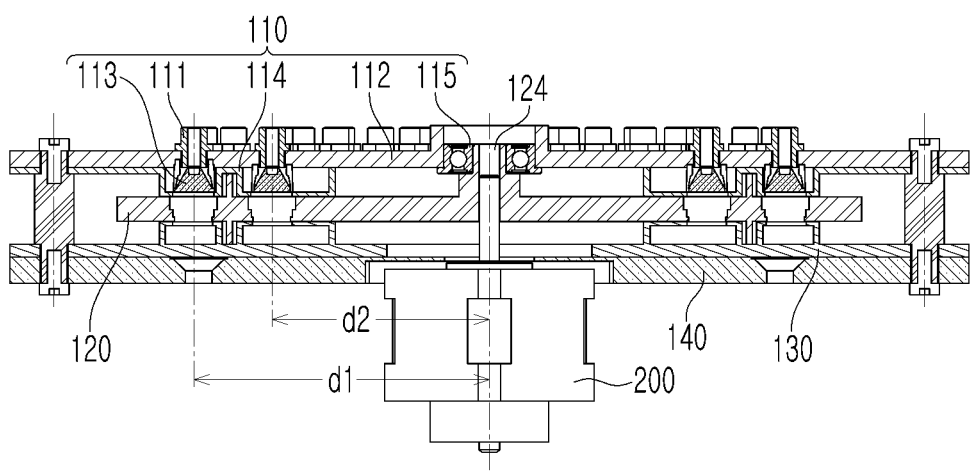

[Fig. 4]
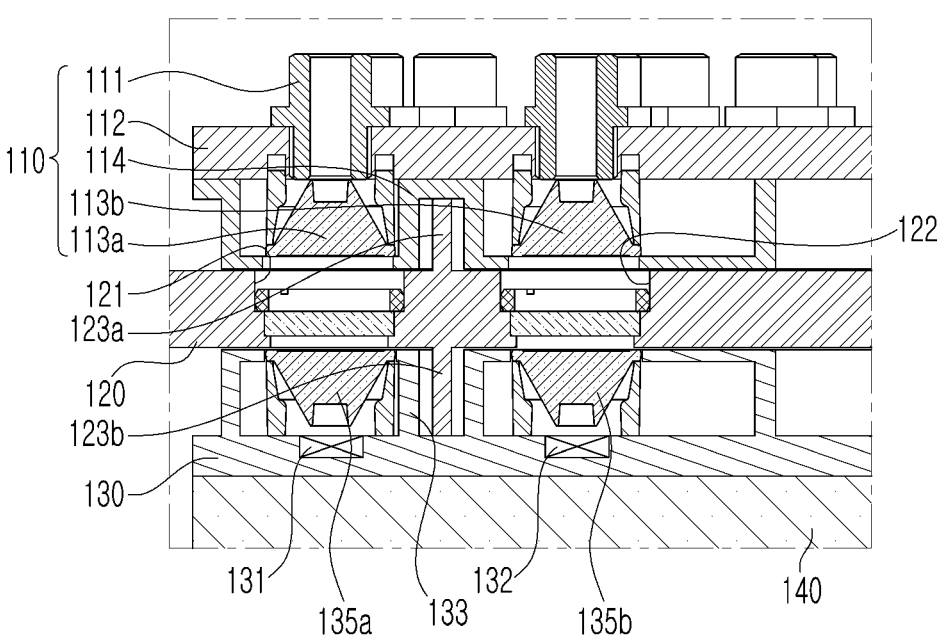

[Fig. 5]
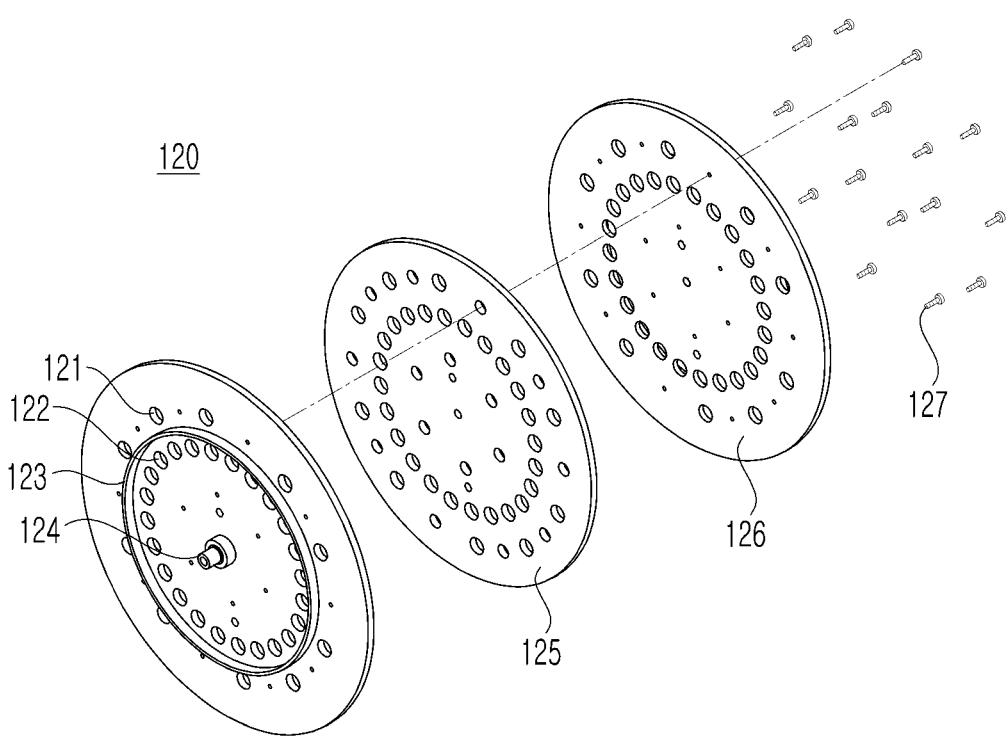

[Fig. 6]
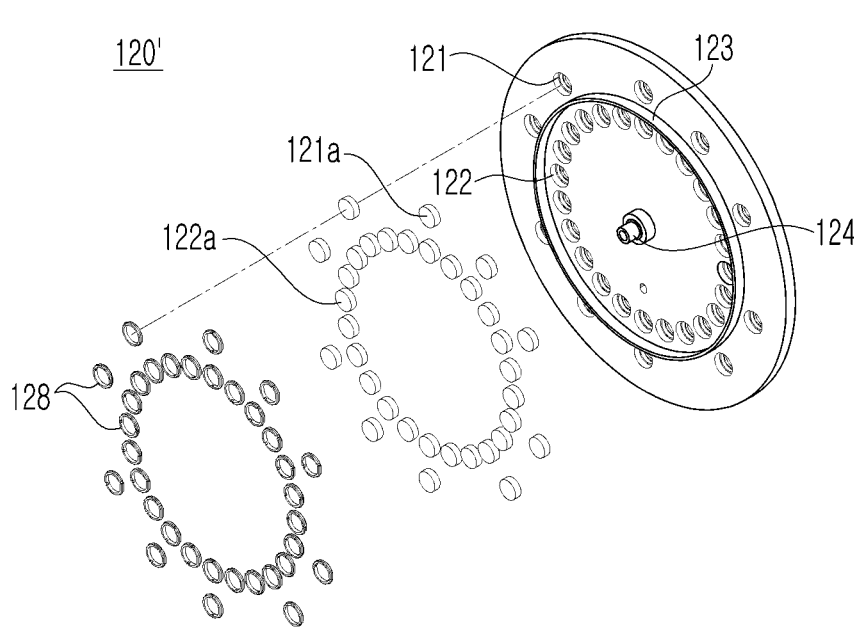

[Fig. 7]
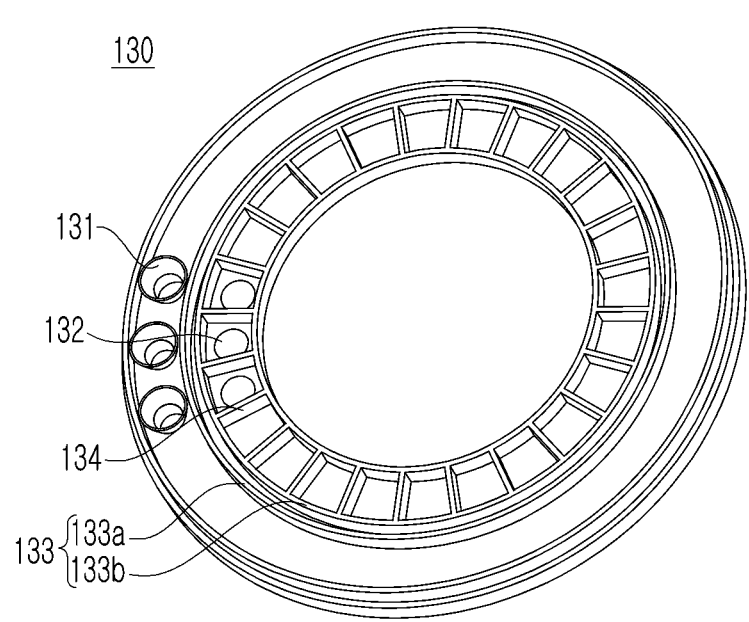

[Fig. 8]
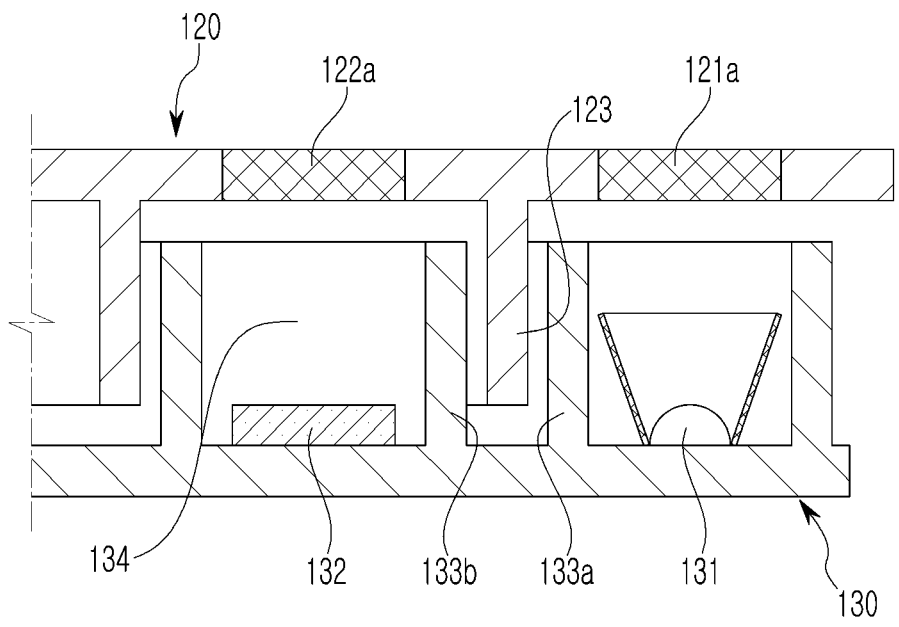

[Fig. 9]
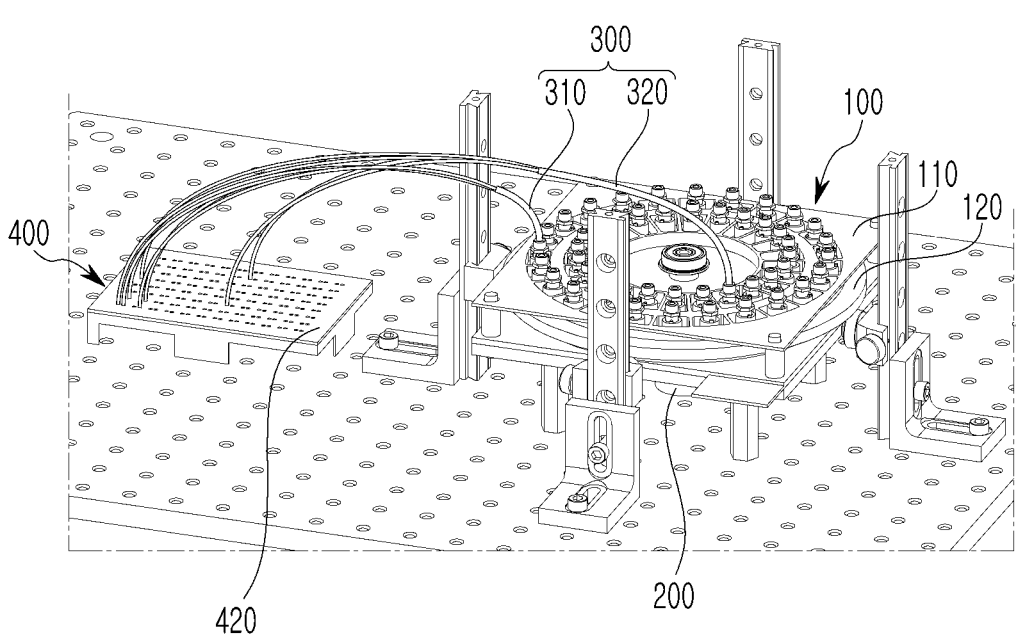

[Fig. 10]
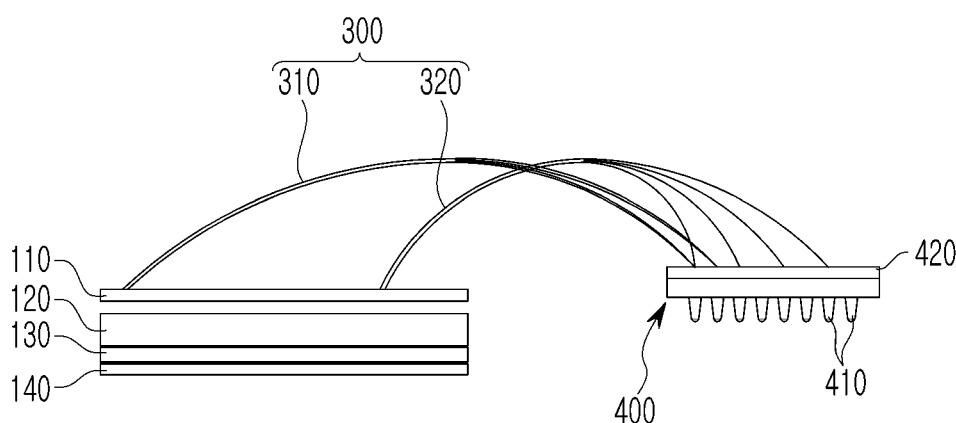

LIGHT DETECTION MODULE AND APPARATUS FOR DETECTING TARGET ANALYTE COMPRISING THE SAME

TECHNICAL FIELD

The present disclosure relates to a light detection module and an apparatus for detecting a target analyte including the same.

BACKGROUND ART

Recently, people's interest in health have been growing along with prolonged human life expectancy. Thus, the importance of accurate analysis of pathogens and in vitro nucleic acid-based molecular diagnosis such as genetic analysis for a patient has increased significantly, and the demand therefor is on the rise.

Generally, nucleic acid-based molecular diagnosis is performed by extracting nucleic acids from a sample and confirming whether a target nucleic acid is present in the extracted nucleic acids.

The most widely used nucleic acid amplification reaction, which is well-known as a Polymerase Chain Reaction (PCR), repeats a cyclic process which includes denaturation of a double-stranded DNA, annealing of an oligonucleotide primer with a denatured DNA template, and extension of the primer by a DNA polymerase (Mullis et al.; U.S. Pat. Nos. 4,683,195, 4,683,202 and 4,800,159; Saiki et al., (1985) Science 230, 1350-1354).

Recently, various nucleic acid amplification apparatuses have been developed for performing a nucleic acid amplification reaction. An example of a nucleic acid amplification apparatus is configured to mount a vessel containing a sample solution including a template nucleic acid in one reaction chamber, and to perform a nucleic acid amplification reaction by repeatedly heating and cooling the vessel.

In order to amplify a deoxyribonucleic acid (DNA) having a specific nucleotide sequence, the apparatus for a nucleic acid amplification reaction may perform a denaturing step, an annealing step, and an extension (or amplification) step.

The DNA denaturation is performed at about 95° C., and the annealing and extension of primers are performed at a temperature of 55° C. to 75° C. which is lower than 95° C. Light sources emit excitement light to samples, and fluorescent materials in the samples which are excited by the excitation light emit fluorescence. Detectors are configured to sense the emission light emitted from the fluorescent materials to analyze amplification reaction. For an apparatus in such an optical signal detection manner, it is required to accurately provide excitation light to the samples and accurately provide emission light to the detectors.

In order to excite only a specific optical label to be detected among optical labels in the sample, a filter for a light source is placed on an excitation light path between the light source and the sample to selectively pass only light of a specific wavelength among the light radiated from the light source.

In a similar manner, in order to detect emission light emitted from the specific optical label, a filter for a detector is placed on an emission light path between the sample and the detector to selectively pass the emission light emitted from the specific optical label among the light radiated from the sample.

By placing the filters corresponding to the target optical label on each of the excitation light path and the emission light path, noise can be reduced and fluorescence can be precisely detected.

Meanwhile, in order to detect the different optical labels among several of them in the sample, the same number of filters as the number of detection channels is required on the light source side as well as the detector side. In order to detect at least two or more different optical labels, a filter set including at least two or more filters corresponding to the number of detection channels should be placed on the light source side as well as the detector side. The plurality of filters in each filter set moves in turn to perform filtering for each channel. The apparatus for detecting an optical signal includes a drive device for moving the filters.

According to the conventional detection method, it is difficult to reduce the time taken to perform filtering while alternately moving the filters. In other words, there is a limit in providing faster results.

In addition, due to the drive device for moving the filters along with other components, the overall cost of preparing the light detection module increases, and the volume of the module also increases, thus lowering space efficiency.

As such, it is necessary to develop a light detection module, and an apparatus for detecting a target analyte including the same, which is capable of reducing the time taken to receive detection results in a situation where rapid detection is required, and is economical and space efficient.

PRIOR ART DOCUMENT

Patent Document (Patent document 1) U.S. Pat. No. 8,236,504 (Aug. 7, 2012)

SUMMARY OF INVENTION

Technical Task

The present disclosure is to provide a light detection module and an apparatus for detecting a target analyte including the same.

The technical tasks to be solved by the present disclosure are not limited to the aforementioned technical task.

Means for Solving the Task

According to an embodiment of the present disclosure, the present disclosure provides a light detection module including: an optical fiber mounting unit having a plurality of optical fibers disposed on one side thereof; a filter wheel spaced apart from the other side of the optical fiber mounting unit, the filter wheel having a plurality of filters; a drive unit for rotating the filter wheel; a light source unit for generating excitation light passing through the filter wheel; and a detection unit for detecting emission light passing through the filter wheel, wherein the plurality of filters includes a plurality of excitation light filters for filtering the excitation light and a plurality of emission light filters for filtering the emission light.

The light source unit and the detection unit may be disposed on the same plate. In some embodiments, the plate may be a printed circuit board (PCB).

The filter wheel may be rotatable between the plate and the optical fiber mounting unit.

The filter wheel may include a protruding portion formed between the plurality of excitation light filters and the plurality of emission light filters.

The drive unit may include a drive shaft and a motor for rotating the drive shaft, the filter wheel may include a central shaft at a central axis linearly aligned to the drive shaft, and the filter wheel may rotate about the central axis.

The light source unit may include a plurality of light sources, and the detection unit may include a plurality of detectors.

Each of the plurality of light sources may be positioned away from the central axis by a first radial distance, and each of the plurality of detectors may be positioned away from the central axis by a second radial distance.

In the filter wheel, the plurality of excitation light filters may be positioned away from the central axis by the first radial distance, and the plurality of emission light filters may be positioned away from the central axis by the second radial distance.

The plurality of light sources may be separated from each other.

The plurality of light sources may be a plurality of light emitting diodes (LEDs).

The plurality of detectors may be separated from each other.

The plurality of light sources may be separated from the plurality of detectors.

A partition portion may be formed between the plurality of light sources and the plurality of detectors.

The plurality of light sources, the plurality of detectors and the partition portion may be disposed on the same plate. In some embodiments, the plate may be a printed circuit board (PCB).

The filter wheel may include a protruding portion formed between the plurality of excitation light filters and the plurality of emission light filters, and protruding portion may overlap at least partially with the partition portion to block light generated from the plurality of light sources.

The partition portion may include a first partition and a second partition protruding from the plate, and the first partition and the second partition may be spaced apart from each other by a predetermined distance.

The protruding portion may be at least partially inserted between the first partition and the second partition.

The light detection module may further include a sample holder for accommodating a plurality of reaction vessels; and a cover for covering a top of the sampler holder.

The plurality of reaction vessels may be assigned into a plurality of sample regions, and a plurality of detectors in the detection unit may each detect a signal emitted from a designated sample region among the plurality of sample regions.

The plurality of optical fibers may be each connected to the optical fiber mounting unit at its one end, and the other end thereof may be connected to the cover.

The other end of each of the plurality of optical fibers may be split into a plurality of strands by a fiber splitter.

The filter wheel may further include an upper plate, a lower plate and a gasket fixed between the upper plate and the lower plate, and the plurality of excitation light filters and the plurality of emission light filters may be mounted on the filter wheel by the gasket.

The filter wheel may include a main body and through-holes formed in the main body, and the plurality of excitation light filters and the plurality of emission light filters may be fitted through the through-holes.

According to another embodiment of the present disclosure, the present disclosure provides an apparatus for detecting a target analyte including the light detection module.

Effect of Invention

According to an embodiment of the present disclosure, excitation light filters and emission light filters are placed together in one filter wheel. According to conventional apparatuses, excitation light filters and emission light filters are placed in separate filter wheels, and are rotated by separate actuators. Accordingly, if the operations of the actuators that drive the respective filter wheels are not synchronized smoothly, problems may occur during detection. To avoid these problems, components for sensing whether each filter is in the correct position and an algorithm therefor may be added, which cause delay in detection. By comparison, according to the apparatus of the present disclosure, excitation light filters and emission light filters are fixed to one filter wheel to operate. In other words, the relative positions of the excitation light filters and the emission light filters are fixed, which always guarantees synchronized movement of a pair of excitation and emission filters for detecting a target, thereby enabling rapid continuous detection.

Also, the present disclosure rotates the filter wheel with only one motor, which enables continuous light radiation and light detection and reduces scan time.

BRIEF DESCRIPTION OF DRAWINGS

FIG. 1 is a perspective view illustrating part of a light detection module according to an embodiment of the present disclosure;

FIG. 2 is an exploded perspective view illustrating part of a light detection module according to an embodiment of the present disclosure;

FIG. 3 is a longitudinal cross-sectional view illustrating a light detection module according to an embodiment of the present disclosure;

FIG. 4 is an expanded cross-sectional view illustrating part of a light detection module according to an embodiment of the present disclosure;

FIG. 5 is an exploded perspective view illustrating some components of a filter wheel of a light detection module according to an embodiment of the present disclosure;

FIG. 6 is an exploded perspective view illustrating some components of a filter wheel of a light detection module according to another embodiment of the present disclosure;

FIG. 7 is a perspective view illustrating a plate of a light detection module according to an embodiment of the present disclosure;

FIG. 8 is a partial cross-sectional view illustrating arrangement relation between a plate and a filter wheel of a light detection module according to an embodiment of the present disclosure;

FIG. 9 is a perspective view illustrating a light detection module according to an embodiment of the present disclosure; and FIG. 10 is a schematic side view illustrating a light detection module according to an embodiment of the present disclosure.

DETAILED MEANS FOR CARRYING OUT THE INVENTION

Hereinafter, the present disclosure will be explained with reference to embodiments and example drawings. The embodiments are for illustrative purposes only, and it should be apparent to a person having ordinary knowledge in the art that the scope of the present disclosure is not limited to the embodiments.

In addition, in adding reference numerals to the components of each drawing, it should be noted that same reference numerals are assigned to same components as much as possible even though they are shown in different drawings. In addition, in describing the embodiments of the present disclosure, when it is determined that a detailed description of a related well-known configuration or function interferences with the understanding of the embodiments of the present disclosure, the detailed description thereof will be omitted.

In addition, in describing the components of the embodiments of the present disclosure, terms such as first, second, A, B, (a), (b), (i), (ii), etc. may be used. These terms are only for distinguishing the components from other components, and the nature or order of the components is not limited by the terms. When a component is described as being "connected," "coupled" or "fastened" to other component, the component may be directly connected or fastened to the other component, but it will be understood that another component may be "connected," "coupled" or "fastened" between the components.

The present disclosure relates to an apparatus for detecting a target analyte in a sample.

As used herein, the term "sample" may include a biological sample (e.g., cells, tissues and fluids from a biological source) and a non-biological sample (e.g., food, water and soil). Examples of the biological sample may include viruses, bacteria, tissues, cells, blood (e.g., whole blood, plasma and serum), lymph, bone marrow fluid, salvia, sputum, swab, aspiration, milk, urine, feces, ocular fluid, semen, brain extract, spinal fluid, joint fluid, thymus fluid, bronchoalveolar lavage fluid, ascites and amniotic fluid. Also, the sample may include natural nucleic acid molecules isolated from a biological source and synthetic nucleic acid molecules. According to an embodiment of the present disclosure, the sample may include an additional substance such as water, deionized water, saline solution, pH buffer, acid solution or alkaline solution.

A target analyte refers to a substance that is the subject of analysis. The analysis may mean obtaining information on, for example, the presence, amount, concentration, sequence, activity or property of the analyte in the sample. The analyte may include various substances (e.g., biological substance and non-biological substance such as compounds). Specifically, the analyte may include a biological substance such as nucleic acid molecules (e.g., DNA and RNA), proteins, peptides, carbohydrates, lipids, amino acids, biological compounds, hormones, antibodies, antigens, metabolites or cells. According to an embodiment of the present disclosure, the analyte may be nucleic acid molecules.

The apparatus for detecting a target analyte of the present disclosure may be an apparatus for detecting a target nucleic acid. The apparatus for detecting a target nucleic acid allows a nucleic acid reaction to be performed in a sample, to detect a target nucleic acid.

The nucleic acid reaction refers to sequential physical and chemical reactions which generate a signal depending on the presence of a nucleic acid of a specific sequence in the sample or the amount thereof. The nucleic acid reaction may include the binding of a nucleic acid of a specific sequence in a sample to other nucleic acids or substances, or replication, cleavage or decomposition of a nucleic acid of a specific sequence in the sample. The nucleic acid reaction may involve a nucleic acid amplification reaction. The nucleic acid amplification reaction may include amplification of a target nucleic acid. The nucleic acid amplification reaction may specifically amplify the target nucleic acid.

The nucleic acid reaction may a signal-generation reaction which can generate a signal depending on the presence/absence of a target nucleic acid in the sample or the amount thereof. The signal-generation reaction may be a technique of genetic analysis such as PCR, real-time PCR or microarray.

Various methods for generating an optical signal which indicates the presence of a target nucleic acid using a nucleic acid reaction are known. Representative examples thereof include the following: TaqMan™ probe method (U.S. Pat. No. 5,210,015), molecular beacons method (Tyagi et al., Nature Biotechnology v. 14 Mar. 1996), scorpion method (Whitcombe et al., Nature Biotechnology 17:804-807 (1999)), sunrise or amplifluor method (Nazarenko et al., 2516-2521 Nucleic Acids Research, 25(12):2516-2521 (1997), and U.S. Pat. No. 6,117,635), lux method (U.S. Pat. No. 7,537,886), CPT (Duck P, et al., Biotechniques, 9:142-148(1990)), LNA method (U.S. Pat. No. 6,977,295), plexor method (Sherrill C B, et al, Journal of the American Chemical Society, 126:4550-4556(2004)), Hybeacons™ (D. J. French, et al., Molecular and Cellular Probes (2001) 13, 363-374 and U.S. Pat. No. 7,348,141), dual-labeled, self-quenched probe (U.S. Pat. No. 5,876,930), hybridization probe (Bernard P S, et al., Clin Chem 2000, 46, 147-148), PTOCE (PTO cleavage and extension) method (WO 2012/096523), PCE-SH (PTO Cleavage and Extension-Dependent Signaling Oligonucleotide Hybridization) method (WO 2013/115442), PCE-NH (PTO Cleavage and Extension-Dependent Non-Hybridization) method (PCT/KR2013/012312) and CER method (WO 2011/037306).

A light detection module according to an embodiment of the present disclosure may be employed in an apparatus for detecting a target analyte such as an apparatus for detecting a nucleic acid. The light detection module according to an embodiment of the present disclosure may detect a signal generated depending on the presence of the target nucleic acid. The apparatus for detecting a nucleic acid may amplify and detect a signal with or without nucleic acid amplification. Preferably, the apparatus detects a signal with nucleic acid amplification.

An apparatus for detecting a target analyte according to an embodiment of the present disclosure may include a nucleic acid amplifier.

A nucleic acid amplifier refers to an apparatus for performing a nucleic acid amplification reaction which amplifies a nucleic acid having a specific nucleotide sequence. Examples of the method for amplifying a nucleic acid include polymerase chain reaction (PCR), ligase chain reaction (LCR) (U.S. Pat. Nos. 4,683,195 and 4,683,202; PCR Protocols: A Guide to Methods and Applications (Innis et al., eds, 1990)), strand displacement amplification (SDA) (Walker, et al. Nucleic Acids Res. 20(7):1691-6 (1992); Walker PCR Methods Appl 3(1):1-6 (1993)), transcription-mediated amplification (Phyffer, et al., J. Clin. Microbiol. 34:834-841 (1996); Vuorinen, et al., J. Clin. Microbiol. 33:1856-1859 (1995)), nucleic acid sequence-based amplification (NASBA) (Compton, Nature 350(6313):91-2 (1991)), rolling circle amplification (RCA) (Lisby, Mol. Biotechnol. 12(1):75-99 (1999); Hatch et al., Genet. Anal. 15(2):35-40 (1999)), Q-beta Replicase (Lizardi et al., BiolTechnology 6:1197 (1988)), and loop-mediated isothermal amplification assay (LAMP) (Notomi, T et al., Nucleic Acids Res. 28(12):E63 (2000)), etc.

An apparatus for detecting a target analyte according to an embodiment of the present disclosure may be an apparatus for performing a nucleic acid amplification reaction with temperature changes. For example, the nucleic acid amplifier may carry out a denaturing step, an annealing step and an extension (or elongation) step to amplify deoxyribonucleic acid (DNA) having a specific base sequence.

In the denaturing step, a sample and reagent solution containing double-stranded DNA templates is heated to a specific temperature, for example about 95° C., to separate double-stranded DNA into single-stranded DNA. In the annealing step, an oligonucleotide primer having a nucleotide sequence complementary to the nucleotide sequence of a nucleic acid to be amplified is provided, and the primer and the separated single-stranded DNA are cooled down to a specific temperature, for example 60° C., to promote the primer binding to the specific nucleotide sequence of the single-stranded DNA to form a partial DNA-primer complex. In the extension step, the solution is maintained at a specific temperature, for example 72° C., after the annealing step to form double-stranded DNA by DNA polymerase based on the primer of the partial DNA-primer complex.

The aforementioned three steps are repeated, for example 10 to 50 times, geometrically amplifying DNA having the specific nucleotide sequence. In some cases, the nucleic acid amplifier may perform the annealing step and extension step simultaneously. In this case, the nucleic acid amplifier may complete one cycle by performing two steps including a denaturing step and an annealing/extension step.

Particularly, an apparatus for detecting a target analyte according to an embodiment may be an apparatus for performing a nucleic acid amplification reaction with temperature changes and a reaction of generating an optical signal depending on the presence of a nucleic acid and detecting the generated optical signal.

A light detection module according to an embodiment of the present disclosure includes a filter wheel assembly, a drive unit, an optical fiber and a sample holder.

The main constitution of a filter wheel assembly of a light detection module according to an embodiment of the present disclosure is explained with reference to FIG. 1. FIG. 1 is a perspective view illustrating part of a light detection module according to an embodiment of the present disclosure.

As shown in FIG. 1, the filter wheel assembly 100 includes, as the main components, an optical fiber mounting unit 110, a filter wheel 120, a plate 130, and a motor mounting unit 140.

A plurality of optical fibers (see FIG. 9) is disposed on one side of the optical fiber mounting unit 110. The filter wheel 120 having a plurality of filters is disposed on the other side of the optical fiber mounting unit 110. The plate 130 includes a light source unit for generating light and a detection unit for detecting light. In some embodiments, the plate 130 may be a printed circuit board (PCB). The light source unit includes a plurality of light sources 131, and the detection unit includes a plurality of detectors 132 (see FIG. 8).

In some embodiments, the plurality of light sources 131 may each be a light source that generates polychromatic excitation light. For example, white LEDs, halogen lamps, xenon lamps, tungsten-halogen lamps or quartz tungsten-halogen lamps may be used. Preferably, white LEDs are used as the plurality of light sources 131 to generate polychromatic excitation light, and suitable filters may be used to provide light with desired excitation wavelengths.

In some embodiments, the excitation wavelength provided by the light sources and excitation filters may be, for example, 450-490 nm (for FAM or SYBR Green I), 515-535 nm (for Hex, Vic, Tet or Cal Gold 540), 535-538 nm (for Hex, Vic, or Cal Orange 560), 560-590 nm (for Rox, Texas Red or Cal Red 610), 620-650 nm (for Cy5 or Quasar 670) and 672-684 nm (for Quasar 705).

According to an embodiment of the present disclosure, the light source unit and the detection unit may be disposed on the same plate 130. This configuration allows for a very compact light detection module. The filter wheel 120 may be rotatable between the plate 130 and the optical fiber mounting unit 110 by a drive unit 200.

The drive unit 200 supplies power to rotate the filter wheel 120, and the position of the drive unit 200 is fixed by the motor mounting unit 140. The motor mounting unit 140 is placed adjacent to the plate 130. The drive unit 200 may include a motor (e.g., a step motor) for rotating the filter wheel 120, a drive shaft, an encoder, etc.

A light detection module according to an embodiment of the present disclosure is explained in more detail with reference to FIG. 2. FIG. 2 is an exploded perspective view illustrating part of a light detection module according to an embodiment of the present disclosure.

An optical fiber mounting unit 110 fixes optical fibers in predetermined positions. The optical fiber mounting unit 110 may be produced in various shapes and has a shape shown in FIG. 2 as an example.

As shown in FIG. 2, the optical fiber mounting unit 110 according to an embodiment of the present disclosure may include an optical fiber connector 111 and an optical fiber mounting plate 112. The optical fiber connector 111 fixes an optical fiber directly to the optical fiber mounting plate 120, and minimizes light loss. The optical fiber connector 111 may be a conventional connector such as a SubMiniature version A (SMA) connector, but is not limited thereto. The optical fiber mounting plate 112 forms the body of the optical fiber mounting unit 110, and may be a square plate or a circular disk having through-holes as a predetermined pattern, but is not limited thereto. The optical fiber connectors 111 may be mounted on the respective through-holes in the optical fiber mounting plate 112.

According to another embodiment, optical fiber connectors 111 may be fitted into through-holes in the optical fiber mounting plate 112. According to another embodiment, optical fiber connectors 111 may have a threaded shape and be screw-coupled to through-holes in the optical fiber mounting plate 112.

In addition, the optical fiber mounting unit 110 according to an embodiment of the present disclosure may include a lens 113 and a light blocking portion 114. The lens 113 may be a condenser lens. The light blocking portion 114 may prevent unintended interference between light that passes through respective optical fibers 300. Specifically, the light blocking portion 114 may have a receiving space surrounding each lens 113, and the receiving space may be formed with a plurality of partitions that separate light passing through one lens 113 from light passing through another lens 113 so as to prevent light interference.

A lens 113 may be disposed between the light blocking portion 114 and the optical fiber mounting plate 112. An optical fiber connector 111 may be provided on one side of the optical fiber mounting plate 112 and a lens 113 may be disposed and/or coupled to the other side thereof.

In addition, the optical fiber mounting unit 110 according to an embodiment of the present disclosure may include a bearing 115. The bearing 115 supports the stable rotation of the filter wheel 120. According to an embodiment of the present disclosure, the bearing 115 may be seated in a through-hole formed in the center of the optical fiber mounting plate 112 and be mounted to surround a central shaft 124 of the filter wheel 120. The central shaft 124 of the filter wheel 120 may be a column-shaped shaft protruding from the center of the filter wheel 120 and rotate by a drive unit 200.

The filter wheel 120 may be a disk-shaped plate having an excitation light filter unit 121 and an emission light filter unit 122 mounted thereon. In the excitation light filter unit 121 and the emission light filter unit 122, excitation light filters and emission light filters are positioned away from the central axis by a first radial distance d1 and a second radial distance d2, respectively (see FIG. 3).

The filter wheel 120 has a protruding portion 123 formed between the excitation light filter unit 121 and the emission light filter unit 122, to block light so as to prevent light interference between the excitation light filter unit 121 and the emission light filter unit 122.

The protruding portion 123 according to an embodiment of the present disclosure may have a protruding partition shape as shown in FIG. 2. The protruding portion 123 may overlap at least partially with light blocking portion 114. The protruding portion 123 is configured to overlap at least partially with the light blocking portion 114, such that particularly, excitation light passing through the excitation light filter unit 121 and emission light passing through the emission light filter unit 122 do not mix with each other, thereby obtaining accurate detection results.

The light detection module according to an embodiment of the present disclosure may further include a fixing frame 150 for firmly fixing the optical fiber mounting unit 110, the plate 130 and the motor mounting unit 140. The fixing frame 150 may include a sliding rail (e.g., a dovetail rail), a sliding mount and a mounting bracket.

In addition, the light detection module according to an embodiment of the present disclosure may further include a homing sensor 160. The homing sensor 160 is mounted on the fixing frame 150 to sense the correct position of the filter wheel 120 in the light detection module. When the filter wheel 120 drives homing to move to a predetermined reference position, the homing sensor 160 senses the reference position. The excitation light filter unit 121 and the emission light filter unit 122 for filtering a plurality of different wavelengths are disposed in the filter wheel 120, and thus the homing sensor 160 is provided to set and sense a reference position for identifying the filter units 121, 122.

The homing sensor 160 may include, for example, a transmitter for transmitting light as an optical sensor and a receiver for receiving light transmitted from the transmitter. A member that is movable between the transmitter and the receiver may be provided in part of the edge of the filter wheel 120 according to embodiment of the present disclosure. While the member moves between the transmitter and the receiver, a signal that is received in the receiver or a signal that is not received in the receiver is generated, and the reference position may be sensed from the signal.

The coupling relation between components according to an embodiment of the present disclosure is explained with reference to FIG. 3. FIG. 3 is a longitudinal cross-sectional view illustrating a light detection module according to an embodiment of the present disclosure.

As shown in FIG. 3, a drive unit 200 may include a motor having a shaft protruding upwards, and the shaft may be inserted and coupled to a central shaft 124 of the filter wheel 120. The central shaft 120 may be stably supported by a bearing 115 of the optical fiber mounting unit 110. The filter wheel 120 may rotate about the central axis which is linearly aligned with the central shaft 124 that is stably supported by the bearing 115.

An optical fiber connector 111 may be provided on one side of the optical fiber mounting plate 112 and a lens 113 may be disposed and/or coupled to the other side thereof, as described above. The optical fiber connector 111 and the lens 113 disposed corresponding thereto may be positioned away from the central axis by a first radial distance d1 or a second radial distance d2.

Specifically, excitation light passes through an optical fiber connector 111 and a lens 113 which are positioned away from the central axis by the first radial distance d1, and emission light passes through an optical fiber connector 111 and a lens 113 which are positioned away from the central axis by the second radial distance d2. Excitation light paths and emission light paths may be positioned away from the central axis by different distances. The first radial distance d1 and the second radial distance d2 are different from each other. Preferably, the first radial distance d1 is greater than the second radial distance d2.

The relative arrangement relation of components between the optical fiber mounting unit 110, the filter wheel 120 and the plate 130 is explained with reference to FIG. 4. FIG. 4 is an expanded cross-sectional view illustrating part of a light detection module according to an embodiment of the present disclosure.

An optical fiber connector 111 and a lens 113 having the filter wheel 120 interposed therebetween, which are positioned away from the central axis by the first radial distance d1, shown in FIG. 3 may be vertically aligned with an excitation light filter unit 121 and a light source 131, as shown in FIG. 4. These components may be aligned away from the central axis by the first radial distance d1.

Here, only the filter wheel 120 may rotate by a drive unit 200 whereas the optical fiber mounting unit 110 and the plate 130 are stationarily fixed. While the filter wheel 120 rotates, a light source 131, a lens 135a in the plate 130, an excitation light filter of the excitation light filter unit 121, a lens 113a in the optical fiber mounting unit 110, and an optical fiber connector 111 may be vertically aligned away from the central axis by the first radial distance d1.

Accordingly, light from the light source 131 may be continuously filtered by the excitation light filter. The filtered light is transmitted to a sample via an optical fiber connected to the optical fiber connector 111, to excite an optical label contained in the sample.

In a similar manner, an optical fiber connector 111 and a lens 113 having the filter wheel 120 interposed therebetween, which are positioned away from the central axis by the second radial distance d2, may be vertically aligned with an emission light filter unit 122 and a detector 132. These components may be positioned away from the central axis by the second radial distance d2.

While the filter wheel 120 rotates, a detector 132 and a lens 135b in the plate 130, an emission light filter of the emission light filter unit 122, a lens 113b in the optical fiber mounting unit 110, and an optical fiber connector 111 may be vertically aligned away from the central axis by the second radial distance d2.

Accordingly, a signal emitted from the sample, for example, emission light emitted from the sample, may be continuously filtered by the emission light filter. The filtered light may be detected by the detector 132 that is fixed to the plate 130, which can be a printed circuit board.

According to the filter wheel assembly 100 according to an embodiment of the present disclosure with a structure that the filter wheel 120 rotates between the optical fiber mounting unit 110 and the plate 130 which are stationarily fixed, the rotation of one filter wheel 120 enables continuous excitation light filtering and emission light filtering. Also, the rotation of the filter wheel 120 with only one motor enables continuous light radiation and light detection, leading to reduction of scan time.

The filter wheel 120 is rotated by the drive unit 200, and may rotate without friction while being spaced apart from the optical fiber mounting unit 110 and the plate 130 by a certain distance. The optical fiber mounting unit 110 and the plate 130 may have a light blocking portion 114 and a partition portion 133, respectively, to overlap at least partially with a protruding portion 123 of the filter wheel 120.

As shown in FIG. 4, the protruding portion 123 may include an upper protruding portion 123a protruding towards the optical fiber mounting unit 110 and a lower protruding portion 123b protruding towards the plate 130. The light blocking portion 114 and the partition portion 133 may be configured to receive the upper protruding portion 123a and the lower protruding portion 123b, respectively. This configuration ensures accurate light radiation and light detection in a state where excitation light passing through the excitation light filter unit 121 and emission light passing through the emission light filter unit 122 do not interfere with each other and are separated from each other.

The constitution of a filter wheel 120 according to an embodiment of the present disclosure is explained with reference to FIG. 5. FIG. 5 is an exploded perspective view illustrating some components of a filter wheel of a light detection module according to an embodiment of the present disclosure.

As shown in FIG. 5, the main body of the filter wheel 120 according to an embodiment of the present disclosure may have three disk-shaped plates fixed to each other. The three disk-shaped plates may include an upper plate, a lower plate 126 and a gasket 125 fixed between the upper plate and the lower plate 126.

Specifically, preferably, each of the upper plate, the gasket 125 and the lower plate 126 is a disk having an excitation light filter unit 121 and an emission light filter unit 122. In the excitation light filter unit 121 and the emission light filter unit 122, excitation light filters and emission light filters are positioned away from a central axis by a first radial distance d1 and a second radial distance d2, respectively.

A protruding portion 123 having a partition shape protrudes from the upper plate to separate the excitation light filter unit 121 from the emission light filter unit 122. The protruding portion 123 may have a circular shape, with its center linearly aligned to the central axis, having a radius that is smaller than the first radial distance d1 and greater than the second radial distance d2.

The central shaft 124 may protrude from the center of the upper plate to be inserted into a bearing 115. A receiving space is formed in part of the central shaft 124 such that a drive shaft 210 of the drive unit 200 is inserted and fixed thereto.

The gasket 125 may be configured to receive a plurality of filters and lenses and fix each position thereof. The gasket 125 may be made of a flexible material, such as silicone, rubber or synthetic resin. The lower plate 126 may be coupled to the upper plate with a fixing member 127. Preferably, the gasket 125 is closely fixed between the lower plate 126 and the upper plate. The fixing member 127 may be a member such as a fixing pin or screw, and the upper plate, the gasket 125 and the lower plate 126 have a plurality of through-holes such that the fixing members 127 are inserted and fixed thereto.

The constitution of a filter wheel 120 according to another embodiment of the present disclosure is explained with reference to FIG. 6. FIG. 6 is an exploded perspective view illustrating some components of a filter wheel of a light detection module according to another embodiment of the present disclosure.

As shown in FIG. 6, the filter wheel 120 according to an embodiment of the present disclosure may have a main body and through-holes in the main body. In some embodiments the through-holes may be threaded. A plurality of excitation light filters 121a and a plurality of emission light filters 122a may be fitted through the through-holes.

An excitation light filter unit 121 and an emission light filter unit 122 may be formed in the main body that is one disk-shaped plate. In the excitation light filter unit 121 and the emission light filter unit 122, excitation light filters and emission light filters are positioned away from the central axis by a first radial distance d1 and a second radial distance d2, respectively.

Specifically, the filter wheel 120 may be configured to directly fix each of an excitation light filter 121a and an emission light filter 122a with a fixing ring 128. The fixing ring 128 may be used to more firmly fix each of the excitation light filter 121a and the emission light filter 122a to the filter wheel 120. For example, the filter wheel 120 may have a plurality of through-holes which allow the fixing rings 128 to be inserted, fitted and/or screw-coupled thereto. Accordingly, filters having different thicknesses may be used for the excitation light filter 121a and the emission light filter 122a, and thus, various types of filters may be used.

In a similar way to the embodiment shown in FIG. 5, a protruding portion 123 having a partition shape is formed in the filter wheel 120 to separate the excitation light filter unit 121 from the emission light filter unit 122. The protruding portion 123 may have a circular shape with its center linearly aligned to the central axis, having a radius that is smaller than the first radial distance d1 and greater than the second radial distance d2.

The central shaft 124 may protrude from the center of the filter wheel 120 to be inserted into a bearing 115. A receiving space is formed in part of the central shaft 124 such that a drive shaft 210 of the drive unit 200 is inserted and fixed thereto.

The constitution of a plate 130 according to an embodiment of the present disclosure is explained with reference to FIG. 7. FIG. 7 is a perspective view illustrating the plate 130 of a light detection module according to an embodiment of the present disclosure.

As shown in FIG. 7, the plate 130 according to an embodiment of the present disclosure may include a light source 131, a detector 132, a partition portion 133 and a side wall 134. According to an embodiment of the present disclosure, a plurality of light sources 131, a plurality of detectors 132, a partition portion 133 and a side wall 134 may be provided on the same plate 130. FIG. 7 is a schematic view illustrating some of the components, and does not show all light sources 131 and detectors 132. The number of light sources 131 and detectors 132 which are practically used may vary according to the need.

The plurality of light sources 131 may be LEDs, and the plurality of light sources 131 may be separated from each other. For example, a light blocking member having a conical shape may be provided around each light source 131, as shown in FIG. 7.

The light sources 131 may be installed in the plate 130 to be separated from the plurality of detectors 132, such that light from the light sources 131 is not transmitted directly to the detectors 132. Specifically, the partition portion 133 may be formed between the plurality of light sources 131 and the plurality of detectors 132.

The partition portion 133 formed between the plurality of light sources 131 and the plurality of detectors 132 may include a first partition 133a and a second partition 133b which protrude from the plate 130. The first partition 133a and the second partition 133b may be spaced apart from each other by a predetermined distance.

A protruding portion 123 of the filter wheel 120 may overlap at least partially with the partition portion 133 to block light from the plurality of light sources 131. The protruding portion 123 may be inserted at least partially between the first partition 133a and the second partition 133b.

The plurality of detectors 132 may be separated from each other. In the plate 130 according to an embodiment of the present disclosure, a side wall 134 may be formed between the plurality of detectors 132 to separate the detectors 132 from each other.

The arrangement relation between the plate 130 and the filter wheel 120 is explained with reference to FIG. 8. FIG. 8 is a partial cross-sectional view illustrating arrangement relation between the plate 130 and the filter wheel 120 of a light detection module according to an embodiment of the present disclosure.

As shown in FIG. 8, as a protruding portion 123 of the filter wheel 120 is arranged between the first partition 133a and the second partition 133b to partially overlap therewith, light from a light source 131 is shielded not to be transmitted directly to a detector 132, while the filter wheel 120 rotates. The plate 130 and the filter wheel 120 may be arranged such that light from the light source 131 passes through an excitation light filter 121a. Also, the plate 130 and the filter wheel 120 may be arranged such that emission light emitted from the sample passes through an emission light filter 122a and reaches the detector 132.

Next, an optical fiber 300 and a sample holder 400 of a light detection module according to an embodiment of the present disclosure are explained with reference to FIG. 9. FIG. 9 is a perspective view illustrating a light detection module according to an embodiment of the present disclosure.

As shown in FIG. 9, the light detection module includes a filter wheel assembly 100, a drive unit 200, an optical fiber 300 and a sample holder 400.

A plurality of optical fibers 300 includes excitation optical fibers 310 and emission optical fibers 320. Note that FIG. 9 only shows one of each of the excitation optical fibers 310 and emission optical fibers 320 in their connected state. When in use, the number of optical fibers 300 connected to the sample holder 400 and filter assembly 100 may depend on the number of reaction vessels 410 (see FIG. 10) used for detection. Each excitation optical fiber 310 and emission optical fiber 320 is connected to the optical fiber mounting unit 110 at one end, and the other end thereof, respectively, is connected to the sample holder 400.

The sample holder 400 accommodates a plurality of reaction vessels 410, and the top of the sample holder may be covered with a cover 420. The cover 420 may be configured to connect two optical fibers to each reaction vessel 410. For example, the cover 420 may include an opening for guiding the excitation optical fiber 310 and the emission optical fiber 320 such that both fibers are connected to one reaction vessel 410, and a light blocking partition so as to prevent light transmitted by the optical fibers 310 and 320, from affecting each other.

According to an embodiment of the present disclosure, the plurality of reaction vessels 410 may be assigned into a plurality of sample regions. Here, a sample region may be a group of reaction vessels 410 that may be irradiated by one light source 131. A single detector 132 can be used to detect fluorescence emitted from a plurality reaction vessels 410 in different sample regions.

In this case, the other end of each of the plurality of optical fibers 300 that is connected to the sample holder 400 may be connected after being split into a plurality of strands by a fiber splitter. Preferably, each reaction vessel 410 may be connected with one strand from an excitation optical fiber 310 and one strand from an emission optical fiber 320.

The strands split from an emission optical fiber 320 may be disposed such that no two strands from the same emission optical fiber 320 is adjacent to each other. That is, the strands from one emission optical fiber 320 may be assigned and fixed to different sample regions that are spaced apart from each other. Thus, the strands in one sample region may all originate from different emission optical fibers 320. This way, when light from a light source 131 is directed into a plurality of reaction vessels 410 in one sample region, the fluorescence emitted from the sample region can be detected via different emission optical fibers 320 and detectors 132 that are assigned to that sample region.

Since the strands originating from the same emission optical fiber 320 are spaced apart from each other, it is possible to prevent undesirable detection of excitation and emission light leak from neighboring reaction vessels.

In an embodiment of the present disclosure, when the excitation optical fibers 310 and the emission optical fibers 320 are split into N number of strands, the number of sample regions may be the total number of reaction vessels 410 divided by N.

For example, in the embodiment shown in FIGS. 9 and 10 of the present disclosure, the excitation optical fiber 310 and the emission optical fiber 320 are split into four strands, and a 96-well reaction plate is used as the plurality of reaction vessels 410. Thus, since 96 divided by 4 equals 24, the 96 wells may be assigned into 24 sample regions. In the case where there are 24 sample regions, there may be 24 light sources 131 and 24 detectors 132. In some embodiments, the number of reaction vessels and sample regions may vary depending on how many samples need detection.

The light from one light source 131 may be transmitted via the four strands of the excitation optical fiber 310 to irradiate four reaction vessels 410. Here, the four reaction vessels 410 in the same sample region may be irradiated at the same time. Further, more than one sample regions may be irradiated at the same time using different light sources 131 and excitation light filters. For example, when five excitation light filters with different wavelengths are used, five sample regions, a total of 20 reaction vessels 410, may be irradiated by the five light sources 131 at the same time.

Likewise, an emission optical fiber 320 may be split into four strands by a fiber splitter. A single detector 132 may detect a signal transmitted via each of the four strands of the emission optical fiber 320 from four designated sample regions among the plurality of sample regions. Thus, there may be one detector 132 for detecting four sample regions. Preferably, no more than one of the four sample regions are subject to detection by the same detector 132 at a time. That is, one detector 132 cannot be used to detect more than one sample region at one time, but it is possible for that detector

132 to detect signals from four designated sample regions each at different times. In practice, if there are four reaction vessels 410 in a sample region, there may be four strands originating from four different emission optical fibers 320 connected to the four reaction vessels 410.

For example, when five light sources 131 irradiate five sample regions having four reaction vessels 410 in each at the same time, the fluorescence from the 20 reaction vessels 410 may be detected via strands from 20 different detectors 132.

The arrangement of a plurality of optical fibers 300 according to an embodiment of the present disclosure is further explained with reference to FIG. 10. FIG. 10 is a schematic side view illustrating a light detection module according to an embodiment of the present disclosure.

For the sake of convenience of explanation, FIG. 10 shows some of the plurality of optical fibers 300, and preferably, an excitation optical fiber 310 and an emission optical fiber 320 of the plurality of optical fibers 300 are shown connected to each reaction vessel 410 (e.g., a well), in practice. The rest of the plurality of optical fibers 300 are omitted.

Light radiated from a light source 131 in the plate 130 is filtered by an excitation light filter 121a in the rotating filter wheel 120, and transmitted to a reaction vessel 410 in the sample holder 400 via an excitation optical fiber 310 mounted on the optical fiber mounting unit 110. The sample in the reaction vessel 410 is excited by the transmitted excitation light, light emitted from the sample passes the optical fiber mounting unit 110 via an emission optical fiber 320 and is filtered by an emission light filter 122a in the rotating filter wheel 120, and a signal is detected by a detector 132 in the plate 130.

An apparatus for detecting a target analyte according to the present disclosure includes the light detection module according to an embodiment of the present disclosure, and detects an optical signal generated from the sample to analyze the sample contained in the sample holder 400.

The optical signal generated from the sample may be generated depending on the properties of a target analyte, for example, the activity, amount or presence (or absence) thereof, specifically depending on the presence (or absence) thereof. The size, change, etc. of an optical signal serves as an indicator quantitatively or qualitatively indicating the properties of a target analyte, specifically the presence or absence thereof. A target analyte may be, for example, a target nucleic acid sequence or a target nucleic acid molecule including the same. Thus, the apparatus for detecting a target analyte of the present disclosure may be an apparatus for detecting a target nucleic acid sequence.

Also, an apparatus for detecting a target analyte according to an embodiment of the present disclosure may further include a controller for controlling a light detection module according to an embodiment of the present disclosure, a frame and a case for housing and supporting the light detection module, a display unit and a thermal module for adjusting the temperature of a sample, etc.

The light source of the light detection module according to the present disclosure supplies a proper optical stimulus to a sample contained in the sample holder 400, and the detection unit senses an optical signal generated from the sample in response thereto.

The optical signal may be a luminescence signal, phosphorescence signal, chemiluminescence signal, fluorescence signal, polarized fluorescence signal or other colored signal. The optical signal may be generated in response to an optical stimulus given to the sample.

The sample holder 400 is assigned into a plurality of sample regions, and each sample region may include a plurality of reaction vessels that each contains a sample. The sample of the present disclosure includes all substances that are contained in the apparatus for detecting a target analyte of the present disclosure to be the subject of the optical signal detection.

In some embodiments, the sample holder 400 may be configured to directly contain a sample or to accommodate a reaction vessel 410 containing a sample. The reaction vessel 410 includes a reaction vessel containing one sample and a reaction vessel classifying and containing a plurality of samples.

The sample holder 400 holds/contains the samples in their own place, such that an optical stimulus, e.g., excitation light, is delivered to the sample and an optical signal, e.g., fluorescence, generated from the sample is delivered to the detection unit as intended.

What is claimed is:

1. A light detection module comprising:

an optical fiber mounting unit having a plurality of optical fibers comprising at least one excitation fiber and at least one emission fiber disposed on one side thereof;

a filter wheel spaced apart from an opposite side of the optical fiber mounting unit, the filter wheel having a plurality of filters;

a drive unit for rotating the filter wheel;

a light source unit for generating excitation light passing through the filter wheel to said at least one excitation fiber; and a detection unit for detecting emission light passing through the filter wheel from said at least one emission fiber, wherein the plurality of filters includes a plurality of excitation light filters for filtering the excitation light and a plurality of emission light filters for filtering the emission light, wherein the drive unit comprises a drive shaft and a motor for rotating the drive shaft, and the filter wheel comprises a central shaft at a central axis linearly aligned to the drive shaft, wherein the filter wheel rotates about the central axis, wherein the light source unit comprises a plurality of light sources, and the detection unit comprises a plurality of detectors, wherein each of the plurality of light sources is positioned away from the central axis by a first radial distance, and each of the plurality of detectors is positioned away from the central axis by a second radial distance, wherein in the filter wheel, the plurality of excitation light filters is positioned away from the central axis by the first radial distance, and the plurality of emission light filters is positioned away from the central axis by the second radial distance, wherein a partition portion is formed between the plurality of light sources and the plurality of detectors, wherein the plurality of light sources, the plurality of detectors and the partition portion are disposed on a single plate, and wherein the filter wheel comprises a protruding portion formed between the plurality of excitation light filters and the plurality of emission light filters, and the protruding portion overlaps at least partially with the partition portion to block light leakage from between the plurality of light sources and the plurality of detectors.

2. The light detection module of claim 1, wherein the partition portion comprises a first partition and a second partition protruding from the plate, and the first partition and the second partition are spaced apart from each other by a predetermined distance.

3. The light detection module of claim 2, wherein the protruding portion is at least partially inserted between the first partition and the second partition.

4. The light detection module of claim 1, further comprising:

a sample holder for accommodating a plurality of reaction vessels; and a cover for covering the top of the sample holder.

5. The light detection module of claim 4, wherein the plurality of reaction vessels is assigned into a plurality of sample regions, and a plurality of detectors in the detection unit each detects a signal emitted from a designated sample region among the plurality of sample regions.

6. The light detection module of claim 4, wherein the plurality of optical fibers is each connected to the optical fiber mounting unit at its one end and another end thereof is connected to the cover.

7. The light detection module of claim 6, wherein another end of each of the plurality of optical fibers is split into a plurality of strands by a fiber splitter.

8. The light detection module of claim 7, wherein a plurality of reaction vessels that are in one sample region are irradiated by one light source.

9. The light detection module of claim 1, wherein the filter wheel further comprises an upper plate, a lower plate and a gasket fixed between the upper plate and the lower plate, and the plurality of excitation light filters and the plurality of emission light filters are mounted on the filter wheel by the gasket.

10. The light detection module of claim 1, wherein the filter wheel comprises a main body and through-holes formed in the main body, and the plurality of excitation light filters and the plurality of emission light filters are fitted through the through-holes.

11. An apparatus for detecting a target analyte comprising the light detection module of claim 1, further comprising a controller for controlling the light detection module, and a thermal module configured to adjust the temperature of a sample.

12. The light detection module of claim 1, wherein the filter wheel is rotatable between the plate and the optical fiber mounting unit.

13. The light detection module of claim 1, wherein the plurality of light sources are separated from each other.

14. The light detection module of claim 1, wherein the plurality of light sources is a plurality of light emitting diodes (LEDs).

15. The light detection module of claim 1, wherein the plurality of detectors are separated from each other.

* * * * *